United States Patent [19]

Stauber et al.

[11] 3,758,837
[45] Sept. 11, 1973

[54] CIRCUIT ARRANGEMENT FOR INFINITE SPEED REGULATION OF INDUCTION MOTORS

[75] Inventors: Siegfried Stauber; Nicolas Giger; Klaus-Peter Schaeffer, all of Zurich, Switzerland

[73] Assignee: Firma E. Oswald, Zurich, Switzerland

[22] Filed: Apr. 14, 1972

[21] Appl. No.: 244,169

Related U.S. Application Data

[63] Continuation-in-part of Ser. No. 40,192, May 25, 1970, abandoned.

[30] Foreign Application Priority Data
May 28, 1969 Switzerland.......................... 8085/69

[52] U.S. Cl.................. 318/212, 318/217, 318/228
[51] Int. Cl. ............................................ H02p 7/36
[58] Field of Search.................... 318/211, 212, 227, 318/228, 229

[56] References Cited
UNITED STATES PATENTS

| | | | |
|---|---|---|---|
| 3,504,255 | 3/1970 | L'Esperance ...................... | 318/212 |
| 2,704,345 | 3/1955 | Jensen .............................. | 318/228 |
| 2,858,494 | 10/1958 | Choudhury ........................ | 318/212 |

*Primary Examiner*—Bernard A. Gilheany
*Assistant Examiner*—Thomas Langer
*Attorney*—Werner W. Kleeman

[57] ABSTRACT

A circuit arrangement for the infinite speed regulation of an induction motor, said induction motor comprising a stator having a pair of windings. One of the windings of the stator is connected across the entire voltage supply source. The circuit arrangement comprises a control circuit branch embodying a capacitor bridging the pair of stator windings and a series circuit arrangement composed of a rectifier means and a resistance connected in parallel to at least one of the stator windings.

10 Claims, 9 Drawing Figures

CIRCUIT ARRANGEMENT FOR INFINITE SPEED REGULATION OF INDUCTION MOTORS

CROSS-REFERENCE TO RELATED CASE

The present application is a continuation-in-part application of our commonly assigned, copending U.S. application, Ser. No. 40,192, filed May 25, 1970, now abandoned and entitled "CIRCUIT ARRANGEMENT FOR THE INFINITE SPEED REGULATION OF AN INDUCTION MOTOR."

BACKGROUND OF THE INVENTION

The present invention relates to an improved circuit arrangement for the infinite speed regulation of an induction motor, the windings of which are arranged at the stator. The invention also concerns the use of the inventive circuitry for a water preparation machine, such as used in making beverage drinks, like coffee, expresso, tea and the like.

Generally, it is known in the art to provide regulation of the speed of rotation of an induction motor by changing frequency or voltage and by pole switching or superimposing a direct-current. However, with these techniques the drawback arises that this speed control or regulation can only be carried out stepwise over certain ranges and that, for instance, when regulating the rotational speed by carrying out voltage changes at the current supply of the motor the starting torque reduces. Reduction in the starting torque can be undesirably noticed even in the presence of small voltage drops.

Now for the purpose of overcoming such disadvantage a control circuit for the purpose of regulating the rotational speed of induction motors has become known to the art by virtue of U.S. Pat. No. 3,504,225, granted Mar. 31, 1970, wherein a rectifier and a capacitor are arranged at the current circuit of a primary winding and an auxiliary winding of an induction motor in such a manner that for the infinite or continuous regulation of the rotational speed the current flowing through the primary winding is varied. Yet, the reduction of the current flowing through the primary winding brings with it an undesired reduction in the torque or rotational moment of the rotor, so that with slight changes in the torque the rotational speed varies markedly. This drawback becomes particularly noticeable in the lower ranges of the rotational speed since the torque-rotational speed characteristic curve is very flat in particular in such ranges, causing great fluctuations in the rotational speed during small changes in torque. This is attributable to the characteristics of the control circuit which is designed such that the reduction in power required for regulation of the rotational speed is greatest at the lower ranges of the rotational speed. In other words, the braking force becomes greater with increasing difference between the maximum possible rotational speed and the operating rotational speed.

For the purpose of avoiding this drawback another known prior art proposal of apparatus for speed control purposes contemplates utilizing a capacitor and a rectifier for changing the current flowing through the auxiliary winding. However, even with this modified proposal the disadvantage exists that the capacitor continuously influences the current flowing through the auxiliary winding and phase displaces the complete amplitude value of such current with regard to the current flowing through the main or primary winding. Consequently, for infinite speed regulation purposes it is necessary to produce a greater braking force than normal at the auxiliary winding. Even though it was possible with this arrangement to improve the starting torque or the behavior of the rotational speed at the lower rotational speed ranges of the motor, still the behavior of the rotational speed at the upper ranges thereof became poorer even with slight changes in the torque.

SUMMARY OF THE INVENTION

Therefore, it is a primary object of the present invention to provide an improved circuit arrangement for the infinite speed regulation of an induction motor which is not associated with the aforementioned drawbacks of the prior art circuitry.

Still another more specific object of the present invention relates to an improved apparatus for the infinite speed regulation of an induction motor which is composed of simple conventional components and is relatively inexpensive to produce.

Another equally important object of the present invention relates to a new and improved circuit arrangement which during continuous speed regulation over the entire range, that is to say from zero rotational speed up to a maximum rotational speed allows for a torque or rotational moment to act upon the induction motor and which torque is accommodated to practical requirements. Consequently, the rotational speed-torque characteristic is very steep or inflexible at the lower and upper rotational speed ranges. The braking force required for control of the rotational speed increases with increasing difference between the operating rotational speed and the zero rotational speed, because the braking force increases as the square of the rotational speed owing to eddy current braking.

A further object of the present invention relates to a new and improved circuit arrangement for the infinite speed regulation of an induction motor wherein the rotational speed can be regulated by the very small power of the auxiliary winding, whereas the full power and therefore the maximum possible torque is present at the main winding.

Now, in order to implement these and still further objects of the invention, which will become more readily apparent as the description proceeds, the inventive circuit arrangement for the infinite speed regulation of an induction motor equipped with stator windings resides in the features that there is provided a main stator winding and an auxiliary stator winding, and the entire alternating-current voltage supply is applied to one of the stator windings, in particular the main winding. The circuit arrangement further incorporates a control circuit branch which is coupled with the auxiliary winding and the same alternating-current voltage supply is applied to such auxiliary winding and the control circuit branch. This control circuit branch comprises a first parallel branch containing a capacitor and a second parallel branch containing a rectifier as well as a resistance possessing a variable resistance value. This control circuit branch serves to increase the braking force at the auxiliary winding during increasing rotational speed of the rotor, the entire alternating-current voltage being applied to the main winding and a maximum torque to the rotor.

An essential aspect of the present invention resides in the features that the phase displacement between the currents of the main winding and the auxiliary winding takes place so to speak periodically or intermittently.

Because of this intermittent or periodic phase displacement, which is not even suggested for any of the heretofore known control circuits, there is realized the advantageous inflexible behavior of the rotational speed of the induction motor.

BRIEF DESCRIPTION OF THE DRAWINGS

The invention will be better understood and objects other than those set forth above, will become apparent, when consideration is given to the following detailed description thereof. Such description makes reference to the annexed drawings wherein.

DETAILED DESCRIPTION OF THE PREFERRED EMBODIMENTS

Figure 1:
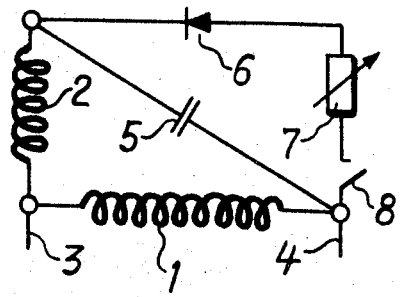
FIGS. 1 and 2 depict two different circuit arrangements of the invention for speed regulation wherein the series circuit is coupled in parallel with both stator windings of a single-phase induction motor.

Describing now the drawing, in the circuit arrangement of FIG. 1 the stator of the two-conductor induction motor consists of a main or primary winding 1 and the auxiliary winding 2. Both stator windings 1 and 2 are conventionally connected to a suitable supply of alternating current 3, 4. The circuit arrangement embodies a control circuit branch incorporating the components 5, 6 and 7 here shown as composed of the parallel branch containing the capacitor 5, and the parallel branch containing the rectifier 6 and resistor 7. In particular, both stator windings 1 and 2 are electrically coupled with capacitor 5 for improving the self-starting characteristics and/or operation of the induction motor. Instead of using the capacitor 5 it is possible to also couple with the auxiliary winding 2 an inductance in order to improve the self-starting and/or operating characteristics.

In the exemplary embodiment illustrated, the rectifier or rectifying means 6 is a diode without a control electrode. In the same conductor as the diode there is connected the ohmic resistance or resistor 7, which for instance may be a variable resistor, a resistor responsive to pressure changes or one responsive to temperature changes (thermistor). Hence, conceptually resistor 7 can be any one of these types of resistance elements for instance, although for convenience it has been symbolized as a variable resistor. Now the series circuit consisting of the diode 6 and the variable resistor 7 is electrically coupled parallel to the primary winding 1. This series circuit operates in such a manner that the capacitor 5 is alternately short-circuited. During the positive half waves, which are passed by the diode 6, the capacitor 5 is short-circuited so that at the primary winding 1 and at the auxiliary winding 2 the currents possess the same phase. During the negative half waves, during which time the diode 6 is blocked, the capacitor 5 is fully effective, and therefore brings about a phase displacement or shift of the currents flowing through both of the aforementioned windings 1, 2. It is important that the complete supply voltage 3, 4 is always applied across one of the windings, here the primary winding 1, and therefore guarantees for a maximum moment of rotation or torque. As a result, there is brought about a change in the rotational speed of the non-illustrated rotor of the induction motor by eddy current braking. This speed regulation is performed in an infinite manner through variation of the resistance 7. Resistance 7 can be changed manually in order to vary the resistance value thereof, or, however, as already mentioned above, can be constructed as a resistance element whose resistance value changes in response to pressure changes or temperature changes appearing in a throughflow heater, such as found in a beverage preparing machine, so that there is provided a closed control circuit. This will be again considered in conjunction with the description of FIG. 4. The induction motor of the invention is particularly useful in such a water preparing machine for making coffee, expresso, tea and the like. The actual details of such water preparing machine are not necessary for an understanding of the inventive concepts since such form part of the subject matter of other patents e.g. U.S. Pat. No. 3,537,384 and are well known to those versed in that particular art. Hence, reference will only be made to this water preparing machine to the extent necessary for completely comprehending the principles of the invention with respect to speed regulation of the motor. As will be explained more fully shortly, the induction motor which is speed regulated drives a feed pump which conveys the water through the throughflow heater. Depending upon the rotational speed of the induction motor, the conveyed quantity of water flowing through the throughflow heater changes. In this manner it is possible to achieve different heating effects upon the water by virtue of the infinite speed regulation of the rotor of the induction motor, so that there is discharged either water at a temperature of about 60° C for instance, boiling water or vapor. Depending upon the rotational speed of the rotor of the induction motor it is therefore possible to produce coffee with the boiling water or water which is at a desired temperature or to produce expresso with the assistance of the vapor or steam.

Figure 2:
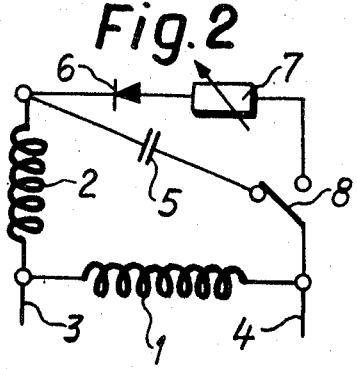

With this environmental background of the circuitry of the invention in mind, reference is now made to the modified circuit shown in FIG. 2. In this case, the series circuit consisting of the diode and the variable resistor 7 are arranged in the same manner with respect to both stator windings 1 and 2 of the induction motor as already described with regard to the circuitry of FIG. 1. The capacitor 5 is provided as a starting capacitor through the action of the switch 8. After the induction motor has started then the switch 8 is thrown from its illustrated contact position into the series circuit, so that only a pulsating direct-current flows in the auxiliary winding 2. In this case, there does not occur any superimposing of a pulsating direct-current upon the alternating-current.

Figure 3:
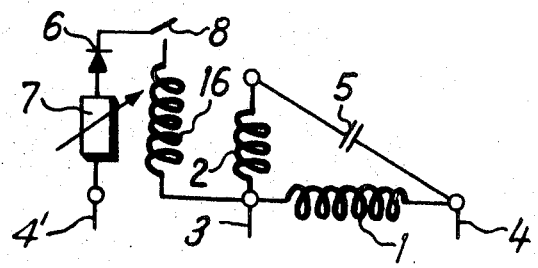
FIG. 3 illustrates a circuit arrangement for speed regulation wherein there is shown a series circuit to a stator winding constructed as a braking winding of a single-phase induction motor and combining aspects of the circuitry of FIGS. 1 and 2.

FIG. 3 again shows a two-conductor induction motor, the stator of which embodies the primary winding 1 and the auxiliary winding 2. The starting capacitor 5 is likewise arranged between both such windings 1 and 2 exactly as in the circuit of FIG. 1. The construction of circuitry of FIG. 3 is a combination of that of FIGS. 1 and 2. The only difference is that in FIG. 3 the series connection or circuit consisting of the diode 6 and the variable resistor 7, connected parallel to the auxiliary winding 2, possesses a further winding 16. Upon switching in the series arrangement 6, 7 and 16 there is undertaken an infinite speed regulation in the same manner as already discussed with regard to FIG. 1. The additional winding 16 is arranged at the stator of the induction motor.

Figure 4:
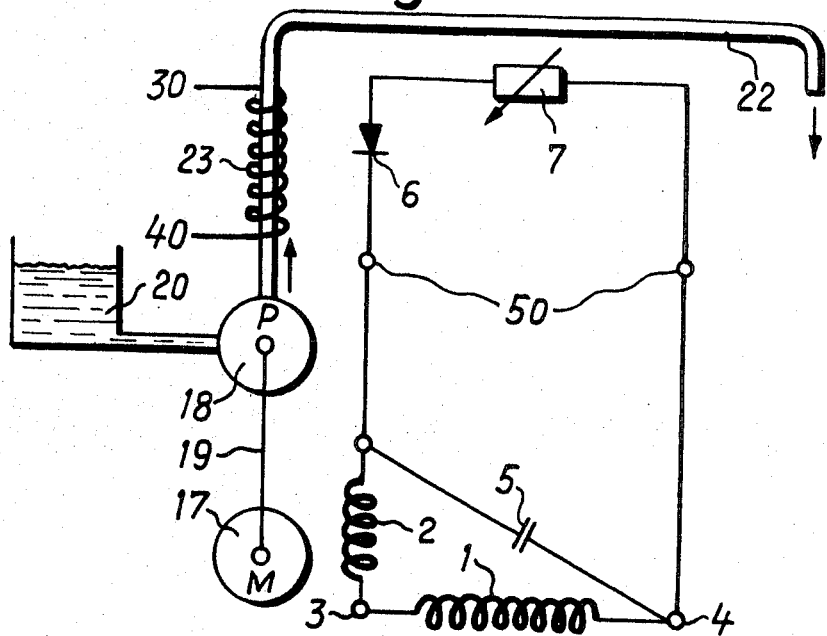
FIG. 4 illustrates a circuit arrangement for speed regulation of an induction motor wherein a variable resistance is adapted to be coupled into a control circuit containing a through-flow heater and conveying pump.

FIG. 4 illustrates the arrangement of the inventive circuitry of FIG. 1 in a water preparing machine for producing coffee, expresso, tea of the like. The water preparing machine may be of the type described, for instance, in the aforementioned U.S. Pat. No. 3,537,384. The armature 17 of the induction motor M drives a water feed pump 18 through the agency of the mechanical shaft 19, this water feed pump 18 pumping water from the water reservoir or supply 20 into the conduit 22. An electrical heating coil 23 is provided along a portion of this conduit 22, heating coil 23 being connected to the same contact terminals or power supply 3, 4, as both of the windings 1, 2 of the induction motor M. The portion of the conduit 22 which is surrounded by the heating coil 23 is conveniently referred to as a throughflow heater. Depending upon the speed of rotation of the induction motor M the conveyed quantity of water flowing through the throughflow heater varies, so that the water is heated to different degrees. Above the throughflow heater there appears either water, at for instance, a temperature of 60° C, boiling water or vapor, which can depart from the conduit 22 in the direction of the arrow at the outlet end thereof and can be used for preparing coffee, expresso, tea or the like. The infinite speed regulation of the armature 17 of the induction motor M takes place via the variable resistor 7 which responds to the temperature prevailing in the conduit 22. At the current circuit of the diode 6 and the resistor 7 of FIG. 4 there have been indicated both terminals 50. Instead of connecting with these terminals 50 the current circuit of FIG. 4 it would be possible to connect thereat the control circuit of FIG. 6 to be discussed shortly hereinafter.

It is also to be mentioned that the diode 6 can be readily arranged in a rectifier bridge. The arrangement of two diodes in an antiparallel circuit or the arrangement of four diodes in the full-wave rectifier bridge circuit serves to reduce or eliminate the ripples of the direct current.

Figure 5A:
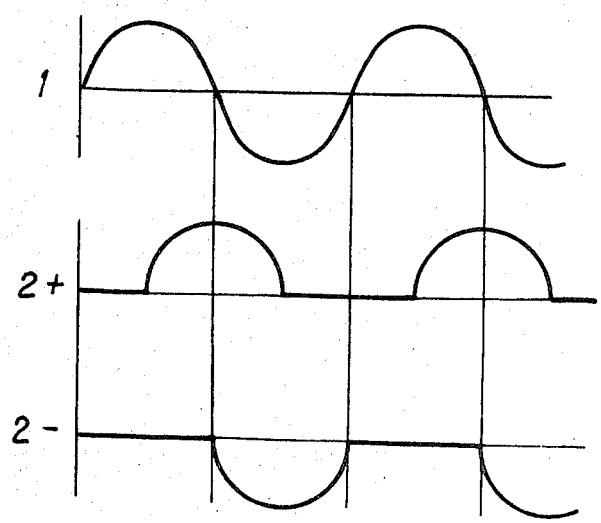
FIGS. 5a, 5b and 5c schematically illustrate graphs depicting the course of the current in the main winding and in the auxiliary winding for different operating conditions of the induction motor.
Figure 5B:
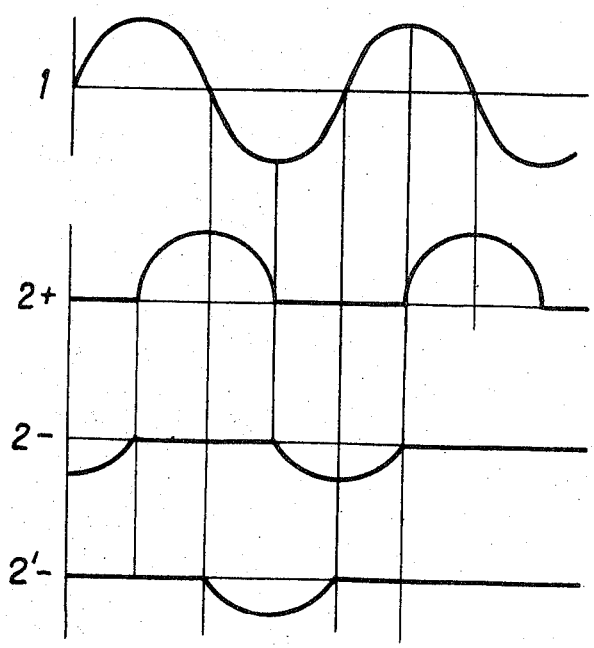
Figure 5C:
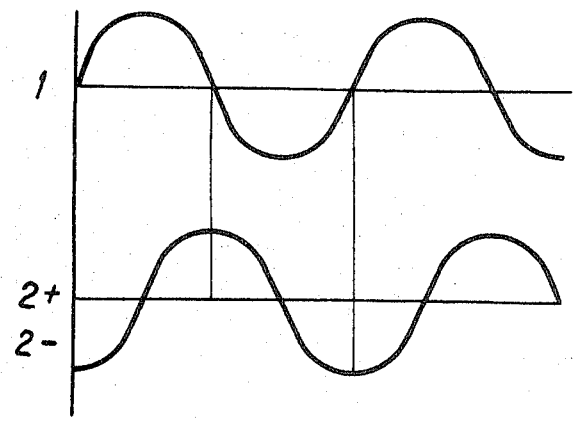

FIGS. 5a, 5b and 5c illustrate in particular the manner in which the curves for the currents flowing through the auxiliary winding 2 behave during different operating conditions. FIG. 5a graphically illustrates the operating condition where the rotational speed of the induction motor amounts to zero, the curve of FIG. 5b graphically portrays the operating condition corresponding to the working rotational speed of the induction motor, and FIG. 5c graphically illustrates the course of the current during maximum possible rotational speed.

Considering now these curves in greater detail, in FIG. 5a the time is plotted along the abscissa and the current intensity along the ordinate for the respective curves denoting the current flow through the primary or main winding 1 and the auxiliary winding 2 respectively. As a matter of simplification in explanation, it has been assumed that the currents are sine waves. Now the sinusoidal or sinus-wave shaped alternating-current flows through the primary winding 1 and has been graphically schematically represented by the uppermost curve of FIG. 5a. In order to simplify the explanation the current flowing through the auxiliary winding 2 has been divided into the graph 2+ and the graph 2−. FIG. 5a illustrates the operating condition where the rotational speed of the induction motor amounts to zero. In this instance, the resistor 7 shown in the circuit arrangements of FIGS. 1, 2 and 3 possess a resistance value equal to zero. The capacitor 5 produces a half-wave at the auxiliary winding 2 (graph 2+) which is phase displaced or shifted 90 electrical degrees with respect to the corresponding half wave of the current flowing through the primary winding. If the switch 8 of the circuit arrangement of FIGS. 1 and 3 is closed, then, the current circuit consisting of the diode 6 and the resistor 7 produces a half wave at the auxiliary winding 2 (graph 2−) which is in-phase with the other half wave of the primary winding 1. Since the resistor 7 has been assumed to possess the resistance value zero, the half wave in the graph 2− is of the same amplitude as the other half wave of the primary winding 1. The current half wave of the graph 2− exerts a braking force (eddy current braking) upon the induction motor which is greatest for the operating condition of FIG. 5a. In reality, the current flowing through the auxiliary winding 2 and portrayed by the graphs 2+ and 2− are to be summated. When resistor 7 is infinitely increasingly regulated, then there is an infinite increase in the rotational speed of the induction motor since the braking force becomes correspondingly smaller.

This has been graphically portrayed in FIG. 5b in which the resistance 7 and the rotational speed of the induction motor possess a predetermined value. This value will be conveniently referred to by the designation working rotational speed. The same sinusoidal current as shown in FIG. 5a flows through the primary winding 1. Now in FIG. 5b the current flowing through the auxiliary winding 2 has been divided into three graphs, 2+, 2−, 2′−, in order to improve the understandability of the invention. The graph 2+ represents the current half wave which is shifted by the capacitor 5 through 90 electrical degrees with respect to the first current half wave of the primary winding 1. The second or other current half waves of the auxiliary winding 2 now flows at less than its maximum intensity through the current circuit consisting of the diodes 6 and the resistor 7, since the value of the resistance has been adjusted to be greater than that for the operating condition of FIG. 5a. In accordance with the operating condition depicted in FIG. 5b, a current component flows through the capacitor 5 and produces at the auxiliary winding 2 a small half wave as such has been represented by the graph 2−. This small half wave is shifted by 90 electrical degrees with respect to the second or other current half waves of the primary winding 1. The current component flowing through the diode 6 and the resistor 7 likewise produce at the auxiliary winding 2 a small half wave which is in-phase with the corresponding current half wave flowing through the primary winding 1. This small half wave, which has been depicted in the graph 2′—, produces the braking force for the induction motor. In reality, the half waves of the graphs 2+, 2—, 2′—, must be added. As already indicated in FIG. 5b, these graphs have been shown separately in order to improve the understanding of the invention. Depending upon the adjustment of the resistor 7, the desired working rotational speed of the induction motor is infinitely regulated between zero rotational speed and the maximum rotational speed.

Now in FIG. 5c there is portrayed the operating condition for the maximum possible rotational speed of the induction motor. In this operating condition, the value of the resistance has been adjusted to be infinite. No current flows through the current circuit of the diode 6 and the resistor 7. The capacitor 5 produces a sinusoidal current at the auxiliary winding 2, the half wave of which is shifted by 90 electrical degrees with regard to the current half wave flowing through the primary winding, and this has been depicted by the graphs 2+ and 2— of FIG. 5c. Since the capacitor 5 has been assumed to be free of losses, the half waves of the current flowing through the auxiliary winding 2 possess the same amplitude as the current flowing through the primary winding 1. The braking force amounts to practically zero since the half waves of both windings 1 and 2 are shifted with respect to one another 90 electrical degrees.

The graphs of 5a, 5b and 5c illustrate that during the control of the rotational speed throughout the entire range always the complete current flows through the primary winding 1 and therefore the maximum possible torque is available for the induction motor. The rotational speed is only controlled by the very small power at the auxiliary winding. It is for this reason that the rotational speed-torque characteristic at the upper and lower ranges of the rotational speed possess a very steep or inflexible course. This constitutes a decisive improvement in contrast to the known devices for rotational speed control or regulation.

There will now be referred to the embodiment of FIG. 2 in conjunction with the graphs of FIGS. 5a, 5b an 5c. In FIG. 2, the capacitor 5 is used as a starting capacitor and such is switched-out during the operation of the induction motor. During operation, the switch 8 switches in the current circuit consisting of the didoe 6 and resistor 7. When using the circuitry of the embodiment of FIG. 2, the graphs 2+ of FIG. 5a and the graphs 2+ and 2— of FIG. 5b are not present.

Figure 7:
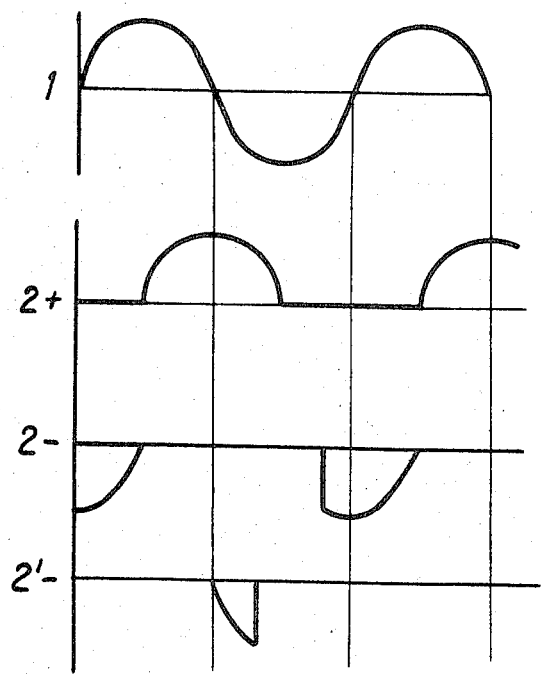
FIG. 7 illustrates in graph form the course of the current in the main winding and at the auxiliary winding during an operating condition of the induction motor in conjunction with the embodiment depicted in FIG. 6.
Figure 6:
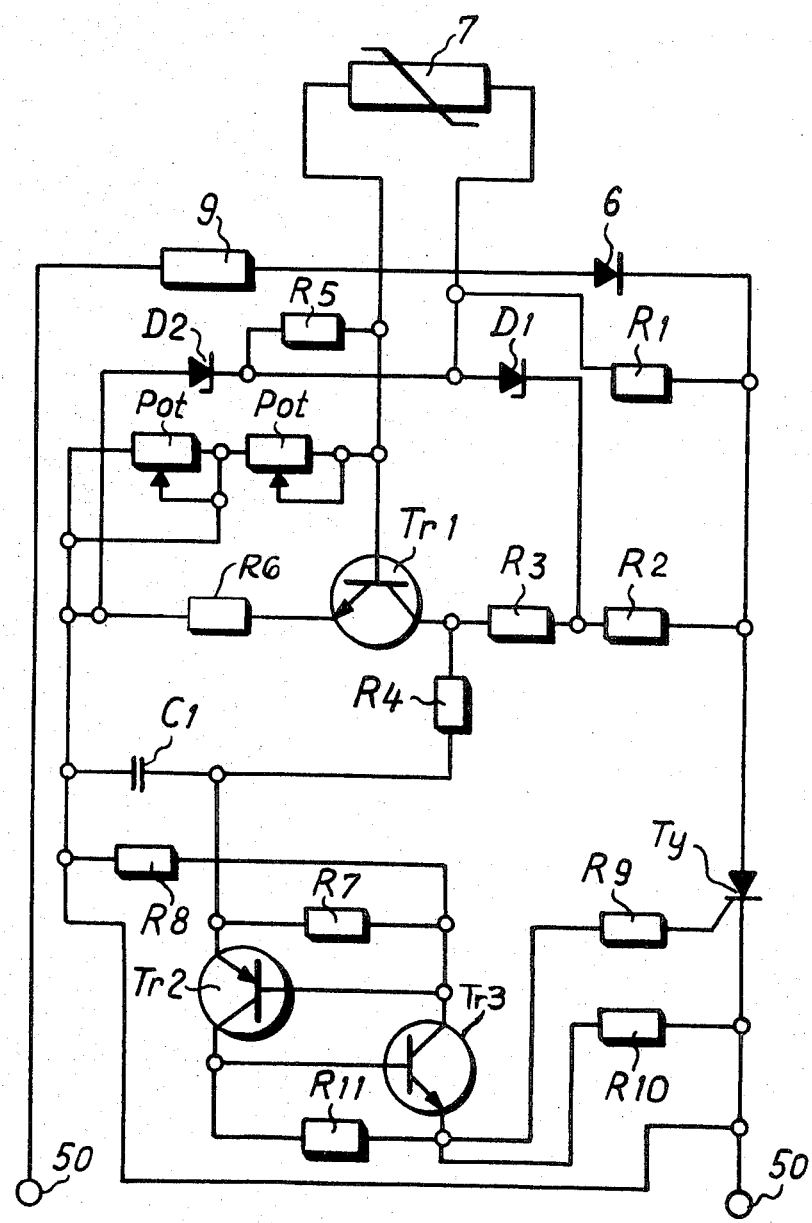
FIG. 6 illustrates circuitry of a further embodiment of the invention.

Continuing, in FIG. 6 there is shown a further embodiment of the invention. The current circuit of FIGS. 1, 2 and 3, consisting of the diode 6 and the resistor 7, has been amplified in the embodiment of FIG. 6 through the provision of a controllable semi-conductor having an ignition circuit. The controllable semi-conductor constructed as a thyristor controls the phase intersection or clipping of a portion of the current flowing through the auxiliary winding 2. This will be explained more fully hereinafter in conjunction with FIG. 7. Now in FIG. 4 there have been illustrated both of the terminals 50 for the current circuit. Instead of there simply being connected the diode 6 and the resistor 7 to these terminals, there is connected thereto the circuit arrangement of FIG. 6. The variable resistor 7 of such circuit is, for instance, a resistor having a negative temperature coefficient. During increase in the temperature at the conduit or tube 22, the resistance value becomes smaller. The output signal of the resistor 7 arrives, according to the circuit design of FIG. 6, at a transistor Tr1 which through the agency of the resistor R4 controls a transistor Tr2. This transistor Tr2 and a further transistor Tr3 control a thyristor Ty in desired manner, so that the thyristor cuts or clips the phase of that wave of the current flowing through the auxiliary winding 2 which is responsible for the braking force of the induction motor. Both of the transistors Tr2 and Tr3 provided for ignition of the thyristor Ty serve to insure "pre-ignition" of the thyristor. This point in time of ignition is approximately prior to the null cross-over of the half wave appearing at the thyristor. As a result, there is insured a disturbance-free functioning of the thyristor at other electrical or electronic devices arranged in the neighborhood thereof. In this regard there should be understood, among other things, that no disturbances will be transmitted to other electrical devices placed nearby. By means of both potentiometers Pot arranged at the base-emitter circuit of the transistor Tr1 of FIG. 6, there can be adjusted the reference value of the temperature. Ignition of the thyristor occurs as a function of such adjustment. Both Zener diodes D1 and D2 serve to maintain the voltage constant. The thyristor Ty together with a current-limiting resistor 9 and the diode 6 are arranged at the current circuit between the terminals 50 of FIG. 4. Instead of using the thyristor it would also be possible to employ a triac. Moreover, both of the transistors Tr2 and Tr3 can be replaced by an unijunction transistor.

With the embodiment of FIG. 6, there is applicable for the operating condition (motor rotational speed = 0) the graph of FIG. 5a and for the operating condition (motor rotational speed = maximum) the graph of FIG. 5c. The graph of FIG. 5b is not applicable for the embodiment of FIG. 6 for the operating condition (working rotational speed) rather there is applicable the graph of FIG. 7. Now according to the graph of FIG. 7, the sinus-shape current flows through the primary winding 1. Capacitor 5 brings about a displacement of the half wave having one polarity of the auxiliary winding 2 through 90 electrical degrees with respect to the first half wave of the primary winding 1. The diagram 2+ illustrates this phase displacement or shifting, wherein the amplitudes of both half waves are of the same magnitude. Additionally, through the auxiliary winding 2 there flows a portion of the capacitor current (graph 2—) and a portion of the thyristor current (graph 2′—). Both portions are delivered from the half wave of the other polarity. In reality, the current curves of the graphs 2+, 2— and 2′— must be added. Here also for the purpose of improving comprehensibility they have been shown separately in FIG. 7. The phase of both components (graphs 2—, 2′—) which produce the braking force for the induction motor, are cut by the thyristor Ty. The phase cut-control by means of the thyristor, in the same manner as for the embodiments of FIGS. 1 and 3 in conjunction with the graph of FIG. 6, brings about an infinite regulation of the braking force and thus an infinite control of the rotational speed of the induction motor. The advantages are the same as those described in conjunction with the discussion of the graphs of FIGS. 5a, 5b and 5c. However, instead of there being present the ohmic resistor 7 associated with losses, here there is employed the thyristor or triac which is free of losses.

When, as already mentioned, instead of there being used the thyristor, there is employed a conventional triac, not particularly illustrated in the drawing, then this triac influences the current half waves of the auxiliary winding 2 depicted in the graphs 2+, 2− and 2'−.

While there is shown and described present preferred embodiments of the invention, it is to be distinctly understood that the invention is not limited thereto but may be otherwise variously embodied and practiced within the scope of the following claims. Accordingly,

What is claimed is:

1. A circuit arrangement for the infinite speed regulation of an induction motor comprising a stator having a pair of windings, a voltage supply source, one of the windings of said stator being connected across the entire voltage supply source, said circuit arrangement comprising a control circuit branch embodying a first parallel branch containing only a capacitor bridging said pair of windings and a second parallel branch comprising a series circuit arrangement composed of a rectifier means and a resistance connected in parallel to said stator windings.

2. The circuit arrangement as defined in claim 1, wherein one of the pair of windings defines a main winding and the other of said pair of windings an auxiliary winding, said entire voltage supply source being connected across said main winding and maximum torque being applied to the rotor of the induction motor, said control circuit branch serving to vary the rotational speed of the rotor without changing said maximum torque.

3. The circuit arrangement as defined in claim 2, wherein said control circuit branch produces a periodic phase displacement between the current flowing through the main winding and the auxiliary winding.

4. The circuit arrangement as defined in claim 1, wherein said rectifier means is arranged in parallel with said capacitor and comprises a diode.

5. The circuit arrangement as defined in claim 1, wherein said resistance is arranged in parallel with said capacitor and is variable.

6. The circuit arrangement as defined in claim 5, wherein said variable resistance is temperature responsive.

7. The circuit arrangement as defined in claim 5, wherein said variable resistance is pressure responsive.

8. The circuit arrangement as defined in claim 5, wherein said variable resistance is coupled in control circuit containing a throughflow heater and conveying pump.

9. The circuit arrangement as defined in claim 1, further including switch means for switching-in and switching-out said series circuit arrangement connected in parallel with said stator windings.

10. The circuit arrangement as defined in claim 1, wherein said rectifier means is a diode and said resistance is variable, and wherein said series circuit arrangement is provided with an additional winding.

* * * * *